3,052,679
HETEROCYCLICAMINOALKYL ETHERS OF 4-METHYL-5,7-DIHYDROXYCOUMARIN
Guido Cavallini and Elena Massarani, Milan, Italy, assignors to Francesco Vismara S.p.A., Casatenovo (Como), Italy, a corporation of Italy
No Drawing. Filed Oct. 11, 1960, Ser. No. 61,812
Claims priority, application Great Britain Oct. 19, 1959
8 Claims. (Cl. 260—247.1)

The present invention is concerned with basic di-alkoxy derivatives of 4-methyl-5,7-dihydroxycoumarin.

Compounds related to 6,7-dihydroxycoumarin (esculetin), particularly 4-methyl derivative (4-methyl-esculetin), and the 6-glucoside (esculin) thereof have already been described as possessing vitamin-P activity and capillary protective action. Such compounds and their monoalicyclic and heterocyclic amino-ether derivatives have also been suggested for the treatment of diseases connected with increased capillary permeability and fragility, but they have the disadvantage of being suitable for injections only.

We have now found that certain new basic 5,7-di-alkoxy derivatives of 4-methyl-5,7-dihydroxycoumarin, are vitamin-P active agents, suitable for oral ingestion and show a capillary-protecting action substantially higher than that of the commonly known vitamin-P-substances.

According to the present invention we provide as new compounds, ethers of the general formula

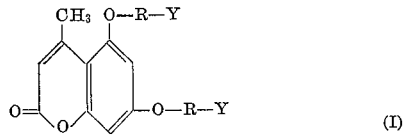

(where R represents a straight or branched chain alkylene group having 1–4 carbon atoms and Y represents a nitrogen atom forming part of a ring system, for example an N-piperidino or N-morpholino group) and their pharmaceutically acceptable organic or inorganic acid addition salts.

As stated above the compounds of this invention have a very pronounced vitamin-P action and are useful as capillary protective agents. They can be used for correcting vitamin-P deficiency in humans and especially for lowering capillary fragility or permeability.

The superior oral activity of the basic 5,7-di-alkyl ethers of 4-methyl-5,7-dihydroxycoumarin of the invention and their acid addition salts is shown in the table below which summarizes the results obtained by subjecting a representative compound according to the invention to a capillary resistance test against scorbutic guinea pigs, in comparison with rutin, one of the vitamin-P substances most active by the oral route.

The biological assay used allows the intensity of vitamin-P action of a given substance to be determined on the basis of the increase in capillary resistance it produces, when it is administered to guinea pigs placed on a scorbutogenic diet (Eddy's diet), consisting of bran, oats and separated milk powder.

The capillary resistance is measured by the suction method of A. L. Bacharach, M. E. Coats and T. R. Middleton (Bioch. J. 36, 407, 1942). Suction is applied to the shaved skin of the animal's back by means of a vacuum pump and the negative pressure registered by a manometer. The pressure recorded is that which overcomes the capillary resistance and consequently cause the appearance of petechiae on the guinea pig's back.

In the table, results under the heading "Effect on Capillary Resistance" were determined by administering each of the test compounds orally in equivalent daily doses to separate groups of 20 animals for three consecutive days and observing at the end of the treatment the variations (increases or decreases) of the limiting negative pressure values. The increase in the value is an index of capillary-protecting activity.

EFFECT ON CAPILLARY RESISTANCE

| Test compound | Variance, percent | | |
|---|---|---|---|
| | Daily dose per os | | |
| | 0.00015/ moles/kg. | 0.0003/ moles/kg. | 0.0006/ moles/kg. |
| 4-methyl-5,7-bis(β-morpholine-ethoxy)-coumarin hydrochloride | +6.3 | +8.5 | +16.4 |
| Rutin | −14.8 | −3.3 | +2.4 |
| 4-methyl-6,7-(β-morpholine-ethoxy)-coumarin hydrochloride | −1.9 | −0.6 | +7 |

From the table, it can be seen that 4-methyl-5,7-bis(β-morpholino-ethoxy)-coumarin is active at doses where rutin is ineffective and that particularly at higher dosages, the activity is considerably superior to that shown by rutin. The efficacy of the compound according to the invention is also demonstrated by comparison with the isomer, 4-methyl-6,7-bis(β-morpholine-ethoxy)-coumarin.

The new compounds according to the present invention can be used for correcting vitamin-P deficiency, for the cure of hemorrhagic conditions and also for the treatment of high blood pressure in arteriosclerosis. They can be administered by oral route both in the form of free bases and as pharmaceutically acceptable addition salts with organic or inorganic acids, preferably in admixture with a solid or liquid pharmaceutical carrier suitable for the preparation of tablets, capsules, lozenges, linctuses, syrups and the like.

The new compounds of this invention may be obtained in any convenient way, advantageously by treatment of 4-methyl-5,7-dihydroxycoumarin with a compound of general formula Hal RY (where Hal represents a halogen atom and R and Y have the above stated meanings), in the presence of an alkaline material such as an alkali metal hydroxide the reaction being carried out in an oxygen containing organic solvent for example an alcohol under anhydrous conditions.

The choice of the solvent is important for obtaining good yields of the end product. Particularly advantageous in the reaction are aliphatic ketones and alcohols, isopropyl alcohol being preferred.

The acid addition salts of the bases may conveniently be obtained by dissolving the compound in a boiling anhydrous alcohol and adding an alcoholic solution of an organic or inorganic acid. The desired acid addition salt generally separates on cooling. Useful acid addition salts include the hydrochloride, hydrobromide, hydroiodide, metho-sulphate, neutral sulphate, acetate, tartrate, benzoate, salicylate salts.

In order that the invention may be well understood, the following examples are given by way of illustration only:

*Example 1*

A mixture of 9.5 g. (0.05 mole) of 4-methyl-5,7-dihydroxycoumarin, 4 g. (0.1 mole) of powdered sodium hydroxide and 200 cc. of anhydrous isopropyl alcohol was refluxed for 30 minutes. 20 g. of 1-(N-morpholine)-2-chloroethane were then added dropwise and the whole refluxed for 10 hours.

The sodium chloride which had formed was filtered hot and the solution was left in the cold; 4-methyl-5,7-bis(β-morpholine-ethoxy)-coumarin crystallized out which, after filtering and drying, weighed 12 g. Mt. pt. 131–132° C. By dissolving the product in boiling anhydrous alcohol and adding an alcoholic solution of hydrochloric acid, the hydrochloride of 4-methyl-5,7-bis-($\beta$-morpholine-ethoxy)-coumarin was obtained at Mt. pt. 195° C. Yield 12.5 g.

Example 2

To a mixture of 9.4 g. of 4-methyl-5,7-dihydroxycoumarin and 200 cc. of anhydrous ethanol, 4 g. of ground sodium hydroxide were added. After refluxing the mixture for approximately half an hour 18 g. of 1-(N-piperidine)-2-chloroethane were added. When the reaction was completed, sodium chloride was filtered off and the solvent evaporated. The residue was taken up in a dilute aqueous sodium hydroxide solution and extracted times with methylene chloride. The combined organic extracts were washed many times with 2% aqueous sodium hydroxide solution, dried over sodium sulphate and the solvent evaporated. The oily residue was taken up in alcohol, filtered and acidified with an alcoholic solution of hydrochloric acid to yield 4-methyl-5,7-bis($\beta$-piperidine-ethoxy)-coumarin hydrochloride as a white crystalline product, Mt. pt. 265–267° C. Yield 7.7 g.

Substituting the hydrochloric acid in the procedure given above and in Example 1 by an appropriate organic or inorganic acid the following salts can be easily obtained: hydrobromide, hydroiodide, metho-sulphate, neutral sulphate, acetate, tartrate, benzoate, salicylate and the like.

Example 3

Following the procedure of Example 1, treating 7 g. of 4-methyl-5,7-dihydroxycoumarin with 15 g. of 1-(N-morpholine)-3-chloropropane in isopropanol solution and in the presence of sodium hydroxide 4-methyl-5,7-(bis-$\gamma$-morpholine-propoxy)coumarin was obtained and converted in the corresponding hydrochloride.

Example 4

Following the procedure of Example 2, 4-methyl-5,7-(bis-$\gamma$-piperidine-propoxy)-coumarin was prepared by reacting 3.5 g. of 4-methyl-5,7-dihydroxycoumarin with 8 g. of 1-(N-piperidine)-3-chloropropane in acetone solution.

Example 5

A mixture of 2.5 g. of potassium hydroxide 4.8 g. of 4-methyl-5,7-dihydroxycoumarin and 200 cc. of dry acetone was refluxed for 20 minutes, then 9.8 g. of 1-(N-piperidine)-2-chloropropane were added. The mixture was refluxed again for 5 hours, the solvent partially eliminated under reduced pressure and the remaining solution filtered and extracted with methylene chloride. The organic extract, worked as in Example 2, gave 4-methyl-5,7-bis-($\beta$-piperidine-propoxy)coumarin hydrochloride.

Example 6

4-methyl-5,7-dihydroxycoumarin (9.5 g.) in isopropanol solution was reacted, as in Example 1, with 21 g. of 1-(N-morpholine)-4-chloro-butane to give 4-methyl-5,7-bis-($\delta$-morpholine-butoxy)-coumarin. This product was dissolved in hot ethanol and treated with an alcoholic solution of acetic acid to give the corresponding acetate.

Example 7

A mixture of 4.7 g. of 4-methyl-5,7-dihydroxycoumarin, 2 g. of sodium hydroxide and 100 cc. of dry ethanol was treated with 10 g. of 1-(N-morpholine)-3-chloro-butane, according to the procedure of Example 2, to give 4-methyl-5,7-bis-($\gamma$-morpholine butoxy)-coumarin. The product dissolved in boiling ethyl alcohol and treated with an ethanol solution of benzoic acid yielded 4-methyl-5,7-bis-($\gamma$-morpholine-butoxy)-coumarin benzoate.

Example 8

A mixture of 2.4 g. of 4-methyl-5,7-dihydroxycoumarin, 1 g. of solution hydroxide, 10 cc. of isopropanol and 6 g. of 1-chloro-2-(N-piperidine)-butane was refluxed for ten hours. After cooling, the solution was filtered and the solvent completely eliminated in vacuo. The residue was taken up with a dilute aqueous solution of sodium hydroxide and extracted several times with methylene chloride. The collected extracts were washed several times with 3% sodium hydrate, dried over sodium sulfate and the solvent evaporated. Then the residue was taken up with isopropyl alcohol, filtered and acidified with dilute sulfuric acid to give 4-methyl-5,7-bis-($\beta$-piperidine-butoxy)-coumarin sulfate.

Example 9

The reaction of 4-methyl-5,7-dihydroxycoumarin, with N-chloromethyl-piperidine, as in Example 2, provided 4-methyl-5,7-bis-(piperidine-methoxy)-coumarin. This compound was isolated under the form of salicylic acid addition salt.

What we claim is:
1. 4-methyl-5,7-bis-($\beta$-morpholine-ethoxy)-coumarin.
2. 4-methyl-5,7-bis-($\gamma$-morpholine-propoxy)-coumarin.
3. 4-methyl-5,7-bis-($\beta$-piperidine-ethoxy)-coumarin.
4. 4-methyl-5,7-bis-($\gamma$-piperidine-propoxy)-coumarin.
5. A compound selected from the group consisting of
   (a) a compound of the formula

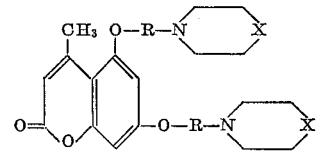

in which R represents an alkylene of 1 to 4 carbon atoms and X is a member selected from the group consisting of oxygen and methylene; and
   (b) pharmaceutically acceptable acid addition salts thereof.
6. A pharmaceutically acceptable acid addition salt of 4-methyl-5,7-bis($\beta$-morpholine-ethoxy)-coumarin.
7. A pharmaceutically acceptable acid addition salt of 4-methyl-5,7-bis-($\gamma$-morpholine-propoxy)-coumarin.
8. A pharmaceutically acceptable acid addition salt of 4-methyl-5,7-bis-($\beta$-piperidine-ethoxy)-coumarin.

References Cited in the file of this patent

Massarani: "Farmaco Pavia," Ed. Sci., vol. 12, pp. 691–4 (1957).